United States Patent Office 3,078,298
Patented Feb. 19, 1963

3,078,298
3-ALKYL (SULFONYL AND SULFOXYL) ACRYLIC ACID ESTERS AND NITRILES
Walter A. Gregory and Hein L. Klopping, Wilmington, Del., assignors to E. I. du Pont de Nemours and Company, Wilmington, Del., a corporation of Delaware
No Drawing. Filed Dec. 15, 1958, Ser. No. 780,256
4 Claims. (Cl. 260—465.4)

This invention relates to novel chemical compounds identified as 3-alkyl(sulfonyl and sulfoxyl) acrylic acid derivatives, to their formulations for use as pesticides, and to methods for the control of pests.

More particularly, the invention is directed to pesticidal compositions containing at least one novel 3-alkyl(sulfonyl or sulfoxyl)acrylic acid ester or nitrile characterized by the formula:

(1)  $\quad$ X—R—SO$_n$—CH=CH—Q where:
X is hydrogen, hydroxy, nitro, cyano, or halogen such as chlorine, bromine or fluorine;
R is a divalent branched or straight chain saturated hydrocarbon radical of less than 7 carbons, namely 1 through 6;
$n$ is a positive integer less than 3, namely 1 or 2; and
Q is —CN or —COOR' where R' is an alkyl radical of less than 19 carbons, namely 1 through 18.

Preferably, because of effectiveness as well as economy and ease of preparation, preferred compounds are those wherein $n$ is 2 and R contains less than 4 carbons.

The esters and nitriles represented by Formula 1 can be made by various methods. According to one exemplary procedure, the esters of Formula 1 can be prepared according to the following equations, where X, R and R' have the same significance as in Formula 1:

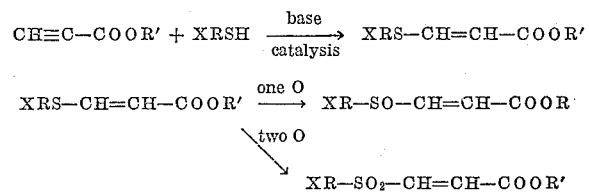

The propiolic acid esters used as starting materials are conveniently prepared by oxidation of propargyl alcohol [cf. Wolf, Ber. 86, 735 (1953)], and esterification of the resulting propiolic acid with the desired alcohol. If desired, the products may be separated into their cis- and trans-isomers. This separation is conveniently accomplished at the sulfide stage by means of fractional distillation at reduced pressure. Oxidation to the sulfoxide stage is preferably carried out under mild conditions, e.g., by using hydrogen peroxide in acetone at room temperature, whereas oxidation to the sulfone stage is best achieved under somewhat more rigorous conditions, e.g., by using peracetic acid in acetic acid. It will be understood that any of a variety of oxidizing agents and methods common to the art for oxidizing sulfides to sulfoxides and sulfones can be used.

The nitriles of Formula 1 can, for example, be prepared from the esters of Formula 1 by conventional methods, i.e., through conversion to the amides and dehydration of these amides by means of P$_2$O$_5$ or SoCl$_2$. In this preparation, the mercapto intermediates can conveniently be used as the starting materials, these mercapto compounds being either mixtures of isomers or pure cis- or trans-isomers.

Another method of preparing the nitriles of Formula 1 is illustrated by the following series of equations:

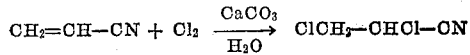

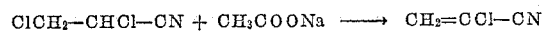

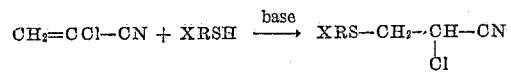

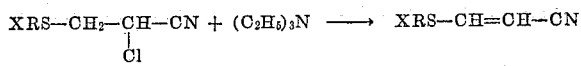

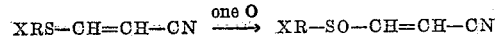

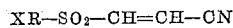

The preparation of alpha-chloroacrylonitrile is described by Brintzinger et al., Angew. Chemie 60, 311 (1948). The general method for reacting this compound with mercaptans, and the subsequent dehydrohalogenation of the product is described by Gundermann [Ann. 588, 174 (1954)]. The procedures for oxidizing the mercaptans to the corresponding sulfoxides and sulfones can be generally the same as discussed above for the esters of Formula 1.

The acrylic acid derivatives of Formula 1 are useful as pesticidal agents, especially as anti-fungal agents, and as bactericidal and protozoicidal agents. They are of particular value because of the wide spectrum of in vitro activity they possess at low concentration (less than 50 p.p.m.) against bacteria, fungi, protozoa, and algae, and the expressions "pests," "pesticidal," etc., as used herein is intended to embrace all of these.

In practicing the fungicidal methods of my invention, a 3-alkyl(sulfonyl or sulfoxyl)acrylic acid derivative of this invention is applied to the material to be treated for the control of fungi at a dosage sufficient to exert fungicidal action. Accordingly, my compounds can be used, for example to treat living plants such as vegetables, ornamental plants, and fruit-bearing trees. Also they may be used to treat organic fibers or fabrics and various cellulosic materials such as paper, cardboard and wood. Likewise, they may be used to treat paints and lubricating oils. One important utility appears to be in the control of fungus diseases of agricultural crops or ornamental plants.

The dosage employed in the fungicidal methods of the invention is largely determined by and dependent upon the particular fungicidal compound selected, and, in the case of application to vegetation, the susceptibility of the particular vegetation to the compound selected, the state and condition of growth of the vegetation to be treated, and the climatic conditions.

In general, the fungicidal compositions of my invention contain in sufficient amount to exert fungicidal action a compound of Formula 1 as an active ingredient in admixture with a carrier material or conditioning agent of the kind used and commonly referred to in the art as a fungicide (or pest control) adjuvant. Usually from about 1% to 95% by weight of the fungicidal composition is active ingredient.

The conventional fungicide adjuvants are inert solids, organic liquid diluents and surface-active agents. They provide formulations adapted for ready and efficient application using conventional applicator equipment. Thus, one or more of my fungicidally-active compounds is admixed with a fungicide adjuvant material to provide a formulation in liquid or solid form.

Solid compositions are preferably in the form of powders. They are compounded to be homogeneous powders that either can be used as such, diluted with inert solids to form dusts or suspended in a suitable liquid medium for spray application. The powders can comprise principally the active ingredient and minor amounts of conditioning agent. They can also be prepared by admixing the active compound with large amounts of finely divided inert solids. Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in wettable powder fungicidal compositions can be used. The active ingredient usually makes up from about 25 to 90% of these wettable powder compositions. Suitable diluents for conversion to dusts are talc, pyrophyllite, tobacco dust, volcanic ash and other dense rapid settling inert solids.

Liquid compositions employing one or more of the fungicidal compounds of my invention are prepared by admixing the active ingredient with a suitable liquid diluent media. The active ingredient can be either in solution or in suspension in the liquid media. Typical of the liquid media commonly employed as fungicide adjuvants are water, kerosene, Stoddard solvent, xylene, alcohols, alkylated naphthalene, and glycols. The active ingredient usually makes up from about 0.5 to 50% of these liquid compositions. Some of these compositions are designed to be used as such, others to be extended with large quantities of water.

Compositions in the form of wettable powders or liquids in many cases also include a surface-active agent of the kind sometimes referred to in the art as a wetting, dispersing or emulsifying agent. These materials cause the compositions to disperse or emulsify easily in water so as to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in articles by McCutcheon in "Soap and Sanitary Chemicals," August, September and October of 1949.

With reference to the compounds of Formula 1, the cis-isomers have been found generally to be more active biologically than the trans-isomers. Also generally, the nitrile compounds of Formula 1 exhibit greater activity than the esters of Formula 1.

In addition to the above, compounds of this invention can be used as active ingredients in disinfectant compositions.

The compounds of this invention are particularly advantageous in that, for example, 3-ethylsulfonylacrylonitrile demonstrates an outstanding stability against decomposure in aqueous solution, even at pH values as high as 8.

In order that the invention will be better understood, the following specific illustrative examples are given in addition to those already set forth above.

EXAMPLE 1

To 19.6 grams (0.2 mole) of ethylpropiolate are added 3 drops of triethylamine, and then 12.4 grams (0.2 mole) of ethylmercaptan are added dropwise with stirring, keeping the temperature of the reaction mixture below 38°. Stirring is continued at room temperature for 3 hours. The dark brown oil is distilled in a high vacuum, and the fraction boiling at 66–70° at 0.7 mm. Hg is collected. The yield is 23 grams of 3-ethylmercaptoacrylic acid, ethyl ester.

Twenty grams (0.125 mole) of this mercapto compound are dissolved in 50 ml. of glacial acetic acid. While stirring, 47.5 grams of 40% peracetic acid (0.25 mole) are added dropwise. After the addition is complete, the mixture is stirred and heated on a steam bath until the peroxide test is negative.

The solution is vacuum concentrated to an oil, weighing 24 grams, which consists essentially of the desired ester. The main impurity is 3-ethylsulfonylacrylic acid, which is converted to the desired ester by dissolving the entire crop of 24 grams in 200 ml. absolute ethanol, adding 5 ml. of thionyl chloride and allowing the mixture to stand overnight. Upon evaporation of the alcohol and drying of the colorless residual oil in a high vacuum, there is obtained 24 grams of 3-ethylsulfonylacrylic acid, ethyl ester.

Analysis.—Calcd. for $C_7H_{12}O_4S$: C, 43.7; H, 6.3; S, 16.7. Found: C, 43.63; H, 6.34; S, 16.34.

In a standardized tube dilution test, 3-ethylsulfonylacrylic acid, ethyl ester has the following anti-microbial spectrum.

| Organism: | Minimum inhibitory concentration, gamma/ml. |
|---|---|
| Aerobacter aerogenes | 25 |
| Bacillus anthracis | 12.5 |
| Bacillus subtilis | 12.5 |
| Brucella abortus | 6.3 |
| Corynebacterium bovis | 12.5 |
| Escherichia coli | 50 |
| Klebsiella pneumoniae A | 50 |
| Micrococcus pyogenes var. aureus | 25 |
| Mycobacterium tuberculosis bovine | 50 |
| Mycobacterium phleii | 6.3 |
| Neisseria catarrhalis | 3.1 |
| Pasteurella multocida | 25 |
| Proteus vulgaris | 12.5 |
| Salmonella gallinarum | 25 |
| Salmonella paratyphi | 25 |
| Salmonella pullorum | 25 |
| Salmonella typhimurium | 50 |
| Sarcina lutea | 6.3 |
| Shigella dysenteriae | 12.5 |
| Streptococcus agalactiae | 25 |
| Streptococcus pyogenes | 50 |
| Vibrio comma | 6.3 |
| Candida albicans | 12.5 |

Twenty parts of the 3-ethylsulfonylacrylic acid, ethyl ester, produced as described above, is mixed with 25 parts of coumarone indene resin, 45 parts ethanol and 5 parts of an alkyl aryl polyether alcohol to give a homogeneous solution. This composition when emulsified in water gives a formulation suitable for application as a foliar fungicide, particularly against *Alternaria solani*, *Venturia inaequalis*, *Uromyces appendiculatus*, *Phytophthora infestans*, *Cercospora apii*, *Diplocarpon rosae*, *Botrytis paeoniae* and *Plasmopara viticola*.

EXAMPLE 2

Sixteen grams of crude 3-ethylmercaptoacrylic acid ethyl ester, prepared as in Example 1, is distilled in a high vacuum using a spinning band column. The following fractions are collected:

(1) Colorless oil, B.P. 47–49°/0.25 mm., $n_D^{25}=1.5099$, 8.5 grams
  IR spectrum: no band at 10.36 microns
  UV spectrum: absorption at 277 millimicrons
  This oil consists of cis-3-ethylmercaptoacrylic acid, ethyl ester.

(2) Colorless oil, B.P. 54–55°/0.25 mm., $n_D^{25}=1.5120$, 4.0 grams
  IR spectrum: absorption at 10.36 microns
  UV spectrum: absorption at 287 millimicrons
  This oil consists of trans-3-ethylmercaptoacrylic acid, ethyl ester.

These two mercapto compounds are oxidized to the corresponding sulfones using the method of Example 1. There are obtained, respectively:

Cis-3-ethylsulfonylacrylic acid, ethyl ester. Colorless syrup, $n_D^{25}=1.4734$.

Analysis.—Calcd. for $C_7H_{12}O_4S$: C, 43.7; H, 6.3; S, 16.7. Found: C, 43.70; H, 6.36; S, 16.71.

Trans-3-ethylsulfonylacrylic acid, ethyl ester. Colorless syrup, $n_D^{25}=1.4709$.

*Analysis.*—Calcd. for $C_7H_{12}O_4S$: C, 43.7; H, 6.3; S, 16.7. Found: C, 44.34; H, 6.33; S, 16.47.

EXAMPLE 3

Ten grams (0.0625 mole) of 3-ethylmercaptoacrylic acid, ethyl ester, prepared as in Example 1, are dissolved in 100 ml. of acetone, and 7.5 grams (0.071 mole) of 30% hydrogen peroxide are added. The mixture is stirred until the peroxide test is negative. Evaporation of the solution and drying of the residual oil yields 12.5 grams of product which consists essentially of 3-ethylsulfonylacrylic acid, ethyl ester.

EXAMPLE 4

To 44.2 ml. of ethylmercaptan is added 1 gram of sodium methoxide. The mixture is cooled to 5°, and stirred. Then 70 grams (0.08 mole) of alpha-chloroacrylonitrile (prepared by the method of Brintzinger et al., Angew Chemie 60, 311 (1948)), are added dropwise. The temperature is allowed to rise to 40° and is kept there by means of external cooling. The addition requires 45 minutes. Stirring is continued at room temperature for three hours. The mixture is filtered and the filtrate is distilled. The fraction boiling at 108–110° at 12 mm. consists essentially of alpha-chloro-beta-ethylmercaptopropionitrile.

Twelve grams of this compound are dissolved in 50 ml. of benzene, and 25 ml. of triethylamine are added. The mixture is refluxed for 3 hours, cooled, and filtered. The filtrate is refluxed for another 3 hours, and a second crop of triethylamine hydrochloride is removed by filtration. The filtrate is concentrated, and the residue is distilled under reduced pressure. The fraction boiling at 111–115° and 18 mm. consists essentially of beta-ethylmercaptoacrylonitrile ($n_D^{25}$=1.5290).

Seven grams of the latter compound are dissolved in 20 ml. of acetic acid, and 24 grams of 40% peracetic acid are added dropwise with stirring. The solution is then heated on the steam bath until the peroxide test is negative. The solution is vacuum concentrated to an orange oil. This oil is dissolved in about an equal volume of chloroform and chromatographed over a column containing 15 times its weight of Alcoa alumina. The first material to leave the column is a colorless oil which crystallizes on standing. After recrystallization from water, the solid melts at 44.5–45° C., and consists essentially of 3-ethylsulfonylacrylonitrile.

*Analysis.*—Calcd. for $C_5H_7NO_2S$: N, 9.65. Found: N, 9.36.

In a standardized tube dilution test, 3-ethylsulfonylacrylonitrile has the following antimicrobial spectrum.

| Organism: | Minimum inhibitory concentration, gamma/ml. |
|---|---|
| Aerobacter aerogenes | 12.5 |
| Bacillus anthracis | 6.3 |
| Bacillus subtilis | 6.3 |
| Brucella abortus | 3.1 |
| Corynebacterium bovis | 6.3 |
| Diplococcus pneumoniae | 25 |
| Escherichia coli | 6.3 |
| Klebsiella pneumoniae A | 6.3 |
| Micrococcus pyogenes var. aureus | 6.3 |
| Mycobacterium tuberculosis bovine | 1.6 |
| Mycobacterium phleii | 0.8 |
| Neisseria catarrhalis | 0.8 |
| Pasteurella multocida | 25 |
| Proteus vulgaris | 6.3 |
| Pseudomonas aeruginosa | 6.3 |
| Salmonella gallinarum | 6.3 |
| Salmonella paratyphi | 6.3 |
| Salmonella pullorum | 6.3 |
| Salmonella typhimurium | 12.5 |
| Sarcina lutea | 0.8 |
| Shigella dysenteriae | 3.1 |
| Streptococcus agalactiae | 6.3 |
| Streptococcus pyogenes | 25 |
| Vibrio comma | 3.1 |
| Candida albicans | 12.5 |
| Mycoderma lipolytica | 12.5 |
| Rhodotorula sp | 12.5 |
| Saccharomyces cerevisiae | 12.5 |
| Saccharomyces pastorianus | 6.3 |
| Torulopsis rotundata | 25 |
| Torulopsis utilis | 12.5 |
| Zygosaccharomyces japonicus | 12.5 |
| Aspergillus fumigatus | 25 |
| Aspergillus niger | 25 |
| Glomerella cingulata | 6.3 |
| Metarrhizium glutinarium | 0.8 |
| Paecilomyces variota | 25 |
| Penicillium citrinum | 12.5 |
| Scopulariopsis brevicaulis | 12.5 |
| Streptomyces griseus | 0.8 |

EXAMPLES 5–19

Using the methods described above, there are prepared the compounds of Table I. The reactants, the amount of each employed, the number of the reference example, and the structural formula of the resulting product are set forth in this table.

*Table 1*

| Reactants (Other than catalysts and oxidizing agents) | Method of Example No. | Product |
|---|---|---|
| CH≡C—COOC$_2$H$_5$ (0.1 m.) CH$_3$SH (0.1 m.) | 1 | CH$_3$SO$_2$—CH=CH—COOC$_2$H$_5$ |
| CH≡C—COOCH$_3$ (0.1 m.) CH$_3$SH (0.1 m.) | 1 | CH$_3$SO$_2$—CH=CH—COOCH$_3$ |
| CH≡C—COOC$_2$H$_5$ (0.1 m.) nC$_3$H$_7$SH (0.1 m.) | 1 | nC$_3$H$_7$SO$_2$—CH=CH—COOC$_2$H$_5$ |
| CH≡C—COOnC$_4$H$_9$ (0.1 m.) C$_2$H$_5$SH (0.1 m.) | 1 | C$_2$H$_5$SO$_2$—CH=CH—COOnC$_4$H$_9$ |
| CH≡C—COOnC$_8$H$_{17}$ (0.1 m.) C$_2$H$_5$SH (0.1 m.) | 1 | C$_2$H$_5$SO$_2$—CH=CH—COOnC$_8$H$_{17}$ |
| CH≡C—COOC$_2$H$_5$ (0.1 m.) nC$_4$H$_9$SH (0.1 m.) | 1 | nC$_4$H$_9$SO$_2$—CH=CH—COOC$_2$H$_5$ |
| CH≡C—COOCH$_3$ (0.1 m.) iC$_3$H$_7$SH (0.1 m.) | 2 | iC$_3$H$_7$SO—CH=CH—COOCH$_3$ |
| CH≡C—COOnC$_{12}$H$_{25}$ (0.1 m.) C$_2$H$_5$SH (0.1 m.) | 2 | C$_2$H$_5$SO—CH=CH—COOnC$_{12}$H$_{25}$ |
| CH≡C—COOnC$_5$H$_{11}$ (0.1 m.) HO—CH$_2$—CH$_2$—SH (0.1 m.) | 1 | HO—CH$_2$—CH$_2$—SO$_2$—CH=CH—COOnC$_5$H$_{11}$ |
| CH≡C—COOnC$_{18}$H$_{37}$ (0.1 m.) sec. C$_4$H$_9$SH (0.1 m.) | 1 | sec. C$_4$H$_9$SO$_2$—CH=CH—COOnC$_{18}$H$_{37}$ |
| CH≡C—COOCH$_3$ (0.1 m.) CH$_3$SH (0.1 m.) | 2 | CH$_3$SO—CH=CH—COOCH$_3$ |
| CH$_2$=C(Cl)—CN (0.1 m.) CH$_3$SH (0.1 m.) | 3 | CH$_3$SO$_2$—CH=CH—CN |
| CH$_2$=C(Cl)—CN (0.1 m.) nC$_3$H$_7$SH (0.1 m.) | 3 | nC$_3$H$_7$SO$_2$—CH=CH—CN |
| CH$_2$=C(Cl)—CN (0.1 m.) sec. C$_4$H$_9$SH (0.1 m.) | 3 | sec. C$_4$H$_9$SO$_2$—CH=CH—CN |
| CH$_2$=C(Cl)—CN (0.1 m.) nC$_6$H$_{13}$SH (0.1 m.) | 3 | nC$_6$H$_{13}$SO$_2$—CH=CH—CN |

Following substantially the procedures given above, the following illustrative compounds can be prepared, as will be readily understood by one skilled in the art:

CH₃SO—CH=CH—COOC₂H₅
CH₃SO—CH=CH—COOnC₄H₉
C₂H₅SO₂—CH=CH—COOnC₅H₁₁
NO₂—CH₂—CH₂—SO₂—CH=CH—COOC₂H₅
Cl—CH₂—CH₂—SO—CH=CH—COOCH₃
N≡C—CH₂—CH₂—SO₂—CH=CH—COOnC₁₈H₃₇
nC₆H₁₃SO—CH=CH—CN
CH₃SO—CH=CH—CN
C₂H₅SO—CH=CH—CN
HO—CH₂—CH₂—SO—CH=CH—CN
NO₂—CH₂—CH₂—SO₂—CH=CH—CN
NO₂—CH₂—CH₂—SO—CH=CH—CN
tert.C₄H₉SO₂—CH=CH—CN
Cl—CH₂—CH₂—SO₂—CH=CH—CN
F—CH₂—CH₂—SO₂—CH=CH—CO₂CH₃
tert.C₅H₁₁SO—CH=CH—COOtert.C₅H₁₁
Br—CH₂—CH₂—SO₂—CH=CH—COOnC₁₂H₂₅

EXAMPLE 20

A suitable fungicidal formulation of the following composition is prepared by mixing the ingredients until a homogeneous solution results.

| Ingredient: | Parts by weight |
|---|---|
| 3-ethylsulfonylacrylic acid, ethyl ester | 25 |
| Coumarone indene resin | 25 |
| Alkyl, aryl polyether alcohol ("Triton" X-155, commercially available from Rohm & Haas Co.) | 5 |
| Ethanol | 45 |

This composition can be emulsified in water and when mixed with water is especially suitable as a foliar spray for application by conventional spray equipment for the protection of living plants from fungi attack.

A suspension containing 0.2% of 3-ethylsulfonylacrylic acid, ethyl ester, is sprayed on tomato foliage. After the deposit has dried, the foliage is inoculated with a suspension of spores of the early blight fungus (*Alternaria solani*) and the foliage is then placed in a chamber where conditions of temperature and humidity suitable for optimum infection are maintained. When sufficient time has elapsed for the formation of visible lesions the foliage is examined. It is found that the treated foliage has 2% disease compared to 100% on the non-treated.

A similar composition containing the active chemical at a concentration of 0.008% is applied to apple foliage. The foliage is inoculated with spores of apple scab fungus (*Venturia inaequalis*) and placed in a chamber where conditions of temperature and humidity suitable for optimum infection are maintained. The treated foliage has 7% disease compared to 100% for non-treated.

In place of 3-ethylsulfonylacrylic acid, ethyl ester, there can be used in the above formulation any of the ester-type compounds shown above. For example, the compound 3-methylsulfonylacrylic acid, ethyl ester, can be employed in place of the compound of Example 1 in the above composition. Such a composition when mixed with water, in an amount such that the aqueous formulation contains 0.2% of the acrylic acid derivative is sprayed on bean foliage. After the deposit has dried, the foliage is inoculated with a suspension of spores of bean rust fungus (*Uromyces appendiculatus*) and placed in a chamber where conditions of temperature and humidity suitable for optimum infection are maintained. After sufficient time has elapsed for the formation of visible lesions, the foliage is examined. It is found that the treated foliage has substantially less disease than the untreated.

EXAMPLE 21

A suitable wettable powder of the following composition is blended, micropulverized and reblended.

| | Parts by weight |
|---|---|
| 3-ethylsulfonylacrylonitrile | 50 |
| Alkyl naphthalene sulfonic acid, sodium salt | 0.5 |
| Methyl cellulose, low viscosity | 0.25 |
| Attapulgite clay | 49.25 |

The resultant wettable powder is suitable for application as an agricultural fungicide. An aqueous suspension of the powder having the active ingredient present at a concentration level of 0.2% is applied to tomato foliage. The foliage is later inoculated with spores of late blight fungus (*Phytophthora infestans*) and placed in a chamber where conditions of temperature and humidity suitable for optimum infection are maintained. After sufficient time has elapsed for the formation of visible lesions, the foliage is examined. It is found that the treated foliage has substantially less disease than the non-treated.

Also, in place of the active ingredient in the composition of this example, one can use any ester or nitrile falling within the scope of Formula I. Thus, for example, the compound 3-methylsulfonylacrylonitrile can be employed as the active ingredient in a composition of this example to effectively control the fungus causing black spot of rose (*Diplocarpon rosae*).

EXAMPLE 22

A suitable wettable powder of the following composition is prepared by mixing the ingredients and passing the mixture through a micropulverizer:

| | Parts by weight |
|---|---|
| 3-ethylsulfonylacrylic acid, n-butyl ester | 50 |
| Synthetic calcium silicate (Micro-Cel) | 49.25 |
| Low viscosity methyl cellulose | 0.25 |
| Alkylated naphthalene sodium sulfonate (commercial wetting agent) | 0.5 |

When made into an aqueous suspension by the addition of water, this suspension is suitable for a foliar spray. A suspension containing 0.2 of the acrylic acid derivative is sprayed on peony foliage. After the deposit has dried, the foliage is inoculated with a suspension of spores of *Botrytis paeoniae*. The foliage is then placed in a chamber where temperature and humidity suitable for optimum infection are maintained. When sufficient time has elapsed for the formation of visible lesions, the foliage is examined. It is found that the treated foliage has substantially less disease than non-treated.

In place of the acrylic acid derivative of the above composition, the n-octyl ester can be employed in an equal amount by weight to prepare a suitable wettable powder. Such a powder wets readily and forms a good dispersion when mixed with a large quantity of water. Such a dispersion is effective in controlling the downy mildew of grapes caused by *Plasmopara viticola*.

EXAMPLE 23

A free-flowing dust is prepared by blending 50 parts of 3-methylsulfonylacrylic acid, methyl ester, and
50 parts of kaolin clay and passing the resulting blend through a micropulverizer. This blend is then diluted with micaceous talc to 20% active in a ribbon blendor. The resultant free-flowing powder is readily applicable to areas to be protected from fungi or bacteria attack by conventional dusting equipment.

In like manner, any other solid derivative of Formula I can be incorporated into a powdery pesticidal formulation.

The invention claimed is:
1. A compound represented by the formula:

$$X—R—SO_n—CH=CH—Q$$

where:

X is selected from the group consisting of hydrogen, halogen, —OH, —NO₂ and —CN; R is a divalent branched or straight chain saturated hydrocarbon of from 1 to 6 carbons; n is a positive integer of from 1 to 2; and Q is selected from the group consisting of —CN and —COOR' where R' is an alkyl radical of from 1 to 18 carbon atoms.

2. A compound as set forth in claim 1 wherein $n$ is 2 and R contains less than 4 carbons.

3. 3-ethylsulfonylacrylonitrile.

4. Cis-3-ethylsulfonylacrylic acid, ethyl ester.

References Cited in the file of this patent

UNITED STATES PATENTS

| | | |
|---|---|---|
| 2,181,057 | Krzikalla et al. | Nov. 21, 1939 |
| 2,354,231 | Walter | July 25, 1944 |
| 2,433,742 | Davis | Dec. 30, 1947 |
| 2,506,019 | Goldberg et al. | May 2, 1950 |
| 2,534,112 | Edwards | Dec. 12, 1950 |
| 2,537,022 | Bartlett et al. | Jan. 9, 1951 |
| 2,556,134 | Croxall et al. | June 5, 1951 |
| 2,675,371 | Coover et al. | Apr. 13, 1954 |
| 2,748,050 | Shearer et al. | May 29, 1956 |
| 2,806,872 | Kartinos et al. | Sept. 17, 1957 |
| 2,837,558 | Lynn | June 3, 1958 |